(12) United States Patent
Terry

(10) Patent No.: US 11,464,701 B2
(45) Date of Patent: Oct. 11, 2022

(54) WALKER SAFETY TRAINING DEVICE AND METHOD OF USE

(71) Applicant: Blake Terry, Tamaroa, IL (US)

(72) Inventor: Blake Terry, Tamaroa, IL (US)

( * ) Notice: Subject to any disclaimer, the term of this patent is extended or adjusted under 35 U.S.C. 154(b) by 87 days.

(21) Appl. No.: 17/077,999

(22) Filed: Oct. 22, 2020

(65) Prior Publication Data

US 2021/0137771 A1    May 13, 2021

Related U.S. Application Data

(60) Provisional application No. 62/932,656, filed on Nov. 8, 2019.

(51) Int. Cl.
| | | |
|---|---|---|
| *A61H 3/04* | (2006.01) | |
| *F16D 59/00* | (2006.01) | |
| *F16D 65/28* | (2006.01) | |
| *F16D 65/00* | (2006.01) | |
| F16D 121/14 | (2012.01) | |
| F16D 127/04 | (2012.01) | |
| F16D 127/00 | (2012.01) | |
| F16D 125/60 | (2012.01) | |

(52) U.S. Cl.
CPC .............. *A61H 3/04* (2013.01); *F16D 59/00* (2013.01); *F16D 65/00* (2013.01); *F16D 65/28* (2013.01); *A61H 2003/046* (2013.01); *A61H 2201/0165* (2013.01); *A61H 2201/0184* (2013.01); *F16D 2121/14* (2013.01); *F16D 2125/60* (2013.01); *F16D 2127/005* (2013.01); *F16D 2127/008* (2013.01); *F16D 2127/04* (2013.01)

(58) Field of Classification Search
CPC .................. A61H 2201/0165; A61H 2003/046
See application file for complete search history.

(56) References Cited

U.S. PATENT DOCUMENTS

| | | | | |
|---|---|---|---|---|
| 5,224,506 A | * | 7/1993 | Allen ........................ | A61H 3/04 |
| | | | | 16/42 T |
| 5,782,256 A | * | 7/1998 | Bradley ................... | A61H 3/04 |
| | | | | 135/84 |
| 10,039,688 B1 | * | 8/2018 | Epp ........................... | A61H 3/04 |
| 2007/0023073 A1 | * | 2/2007 | Su ............................. | A61H 3/04 |
| | | | | 482/68 |
| 2008/0017227 A1 | * | 1/2008 | Ward ........................ | A61H 3/04 |
| | | | | 135/67 |

FOREIGN PATENT DOCUMENTS

| | | | | | |
|---|---|---|---|---|---|
| CN | 108542720 A | * | 9/2018 | ............... | A61H 3/04 |
| CN | 208756470 U | * | 4/2019 | | |
| DE | 202006009042 U1 | * | 9/2006 | ............... | A45B 7/00 |
| WO | WO-2005074855 A1 | * | 8/2005 | ............... | A61H 3/04 |

* cited by examiner

*Primary Examiner* — Melody M Burch

(74) *Attorney, Agent, or Firm* — Singleton Law Firm, P.C.

(57) ABSTRACT

The present invention provides a safety training device capable of being attached to an existing front-wheeled walker. The safety training device a modified ski unit, a braking mechanism, a brake cable and hose. When improper transfer techniques are utilized by a patient, the modified ski unit engages the brake and cable hose to exert a force to the braking mechanism. The braking mechanism activates a braking member on the wheel of the walker, halting further movement of the patient and walker. Simultaneously, a striking member of the braking mechanism makes contact with the frame of the walker, producing an audible cue, alerting the patient and any healthcare professionals present that improper technique is being used in a transfer.

12 Claims, 5 Drawing Sheets

WALKER SAFETY TRAINING DEVICE AND METHOD OF USE

CROSS-REFERENCE TO RELATED APPLICATIONS

The present application claims the benefit of U.S. Provisional Application No. 62/932,656, filed Nov. 11, 2019, titled "Walker Safety Training Device and Method of Use," which is hereby incorporated by reference in its entirety.

BACKGROUND OF THE INVENTION

The present invention relates to medical mobility devices and medical patient safety, particularly to walking frames, also known as "walkers." The invention relates specifically to a safety training device capable of being attached to an existing front-wheeled walker and configured to prevent walker and patient instability and further configured to train a patient to perform safe and proper technique when performing independent transfers, such as from a sitting position to a standing position.

Elderly patients, persons with physical disabilities, or those undergoing physical therapy training commonly utilize walking frames, or walkers, to assist with daily ambulatory functions. While under the care and watch of a medical professional or other caregiver, a patient has easy access to assistance in transferring their body from one position to another. However, where assistance is unavailable, the patient must perform an independent transfer.

Typically, medical professionals will instruct patients how to safely perform this transfer, however, patients typically will revert to improper technique in times of stress or once the professional is no longer present. Improper transfer techniques typically occur where the patient attempts to perform a sit-to-stand or standing pivot transfer by utilizing the walker to assist with the transfer, either by pulling on the walker or by leaning over the walker and pushing down with their upper extremities to bring themselves to a standing position. When this occurs, the walker may become unstable, therefore making the patient unstable and posing an increased risk of the patient falling.

Safety devices known in the art typically function as a simple stop-device, intended to prevent any movement of the walker. However, these safety devices must be engaged by the patient or pre-set to engage and disengage at specific times or positions. The safety device is not configured to train and reinforce proper transfer technique in patients which may reduce risk of injury when performing an independent transfer. This commonly leads to falls, regardless of the presence of the safety device.

Additionally, the safety device is typically integrated into the walker design and, as a result, a patient may be required to purchase a completely new walker. Current safety devices are not capable of being installed on an existing walker that is configured to prevent the walker from becoming unstable during use by a patient, especially during independent transfers where the patient is likely to utilize imperfect technique.

The present invention attempts to remedy the shortcomings of prior art walker safety devices by providing a device capable of being attached to an existing front-wheeled walker and prevent the walker from becoming unstable during use by a patient during independent transfers where the patient utilizes imperfect technique. The present invention also attempts to remedy additional shortcomings of prior art walker safety training and training devices by further providing a device capable of being installed on an existing walker and configured to train and reinforce proper transfer technique in patients.

BRIEF SUMMARY OF THE INVENTION

One or more of the embodiments of the present invention provide a safety training device capable of being attached to an existing front-wheeled walker and configured to prevent walker and patient instability and further configured to train a patient to perform safe and proper technique when performing independent transfers.

The safety training device may include a modified ski unit, a braking mechanism, brake cable and hose. The modified ski unit comprises a housing, a hinged sled member, a suspension member, and at least one compression coil. The braking mechanism may include a pivotable bracket structure, a wheel engagement member and a locking member. The locking member may include a pleated member, a tension member, and a striking member. The brake cable and hose may be connected the modified ski unit and the wheel engagement member of the braking mechanism.

The safety training device is configured so that, upon an amount of force applied to the walker, the hinged sled member rotates and exerts a force on the suspension member and the compression member, which in turn actuates the brake cable and hose, thereby engaging the bracket structure of the braking member. The bracket structure then pivots to prevent the wheel from rotating and releases the locking member and the striking member, such that the striking member emits an audible sound to indicate improper method was utilized.

The methods, systems, and apparatuses are set forth in part in the description which follows, and in part will be obvious from the description, or can be learned by practice of the methods, apparatuses, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed. More details concerning these embodiments, and others, are further described in the following figures and detailed description set forth herein below.

DETAILED DESCRIPTION OF THE INVENTION

The present invention is described in reference to the accompanying drawings and the following embodiments are presented for the purpose of illustration and should not be construed to limit the scope of the invention thereto.

The present invention relates to walker safety training devices. Particularly, a safety training device capable of being attached to an existing front-wheeled walker and configured to prevent walker and patient instability and further configured to train a patient to perform safe and proper technique when performing independent transfers. In an alternate embodiment, the safety training device may be employed on other styles of walkers.

Figure 1:
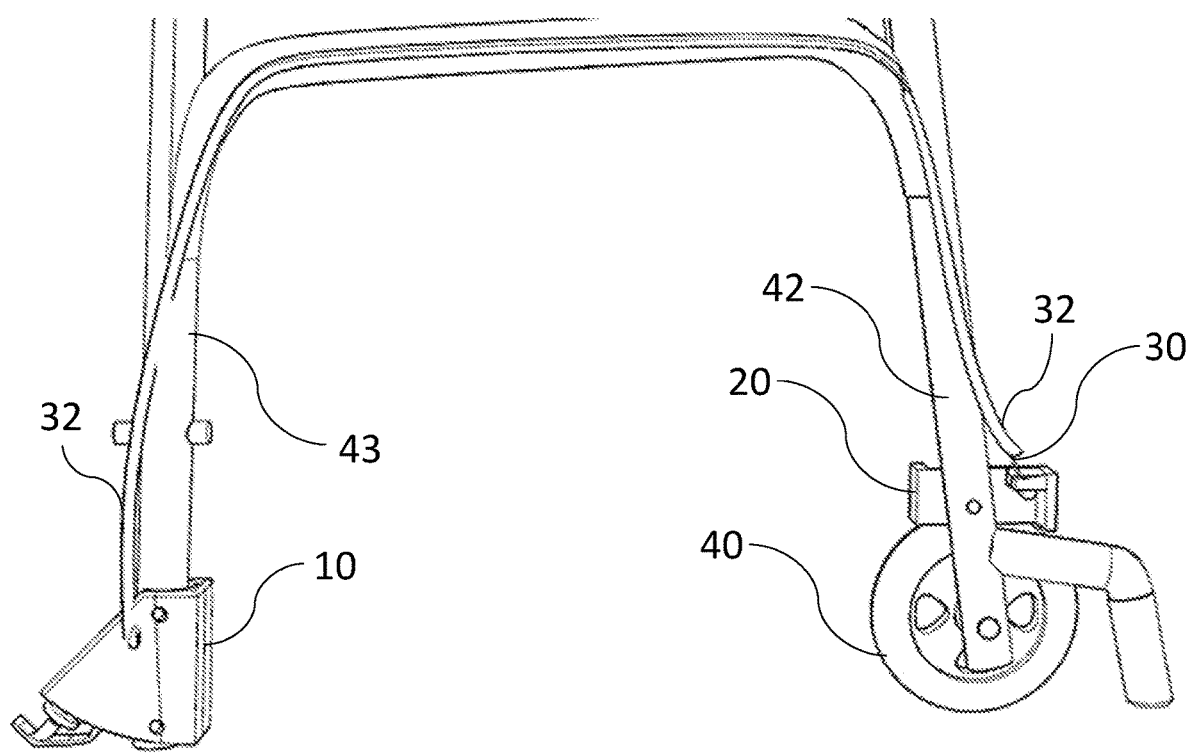
FIG. 1 illustrates a side view of a walker with the braking mechanism and ski unit according to an embodiment of the present invention.

FIG. 1 illustrates one side of the safety training device attached to a walker. The safety training device comprises a modified ski unit 10, a braking mechanism 20, and a brake cable 30 within a hose 32. The walker comprises a first leg 42, a second leg 43, and a wheel 40 attached to the first leg 42. The braking mechanism 20 is attached to the first leg 42 above the wheel 40. The ski unit 10 is attached to the second leg 43 of the walker. On a front-wheeled walker, the first leg 42 may be a front leg of the walker and the second leg 43 may be a rear leg of the walker. Further, in an alternate embodiment of the present invention, the walker may include a safety training device on each pair of front and rear legs.

The suspension member 13 of the modified ski unit 10 is coupled to a first end of the brake cable 30. A second end of the brake cable 30 is coupled to the pivotable bracket structure 21 of the braking mechanism 20. The brake cable 30 may exert a torque on the pivotable bracket structure 21 about the pivot mount 35 when a force is applied to the walker (further described in FIG. 4 and FIG. 5).

In another embodiment, the walker may comprise a hollow frame within which the brake cable 30 and hose 32 may be disposed. The brake cable 30 and hose 32 may be configured to enter the hollow frame near the modified ski unit 10 and exit the hollow frame near the braking mechanism 20. In another embodiment, the brake cable 30 and hose 32 may be coupled to the outside of the walker frame by a plurality of fasteners.

Figure 2:
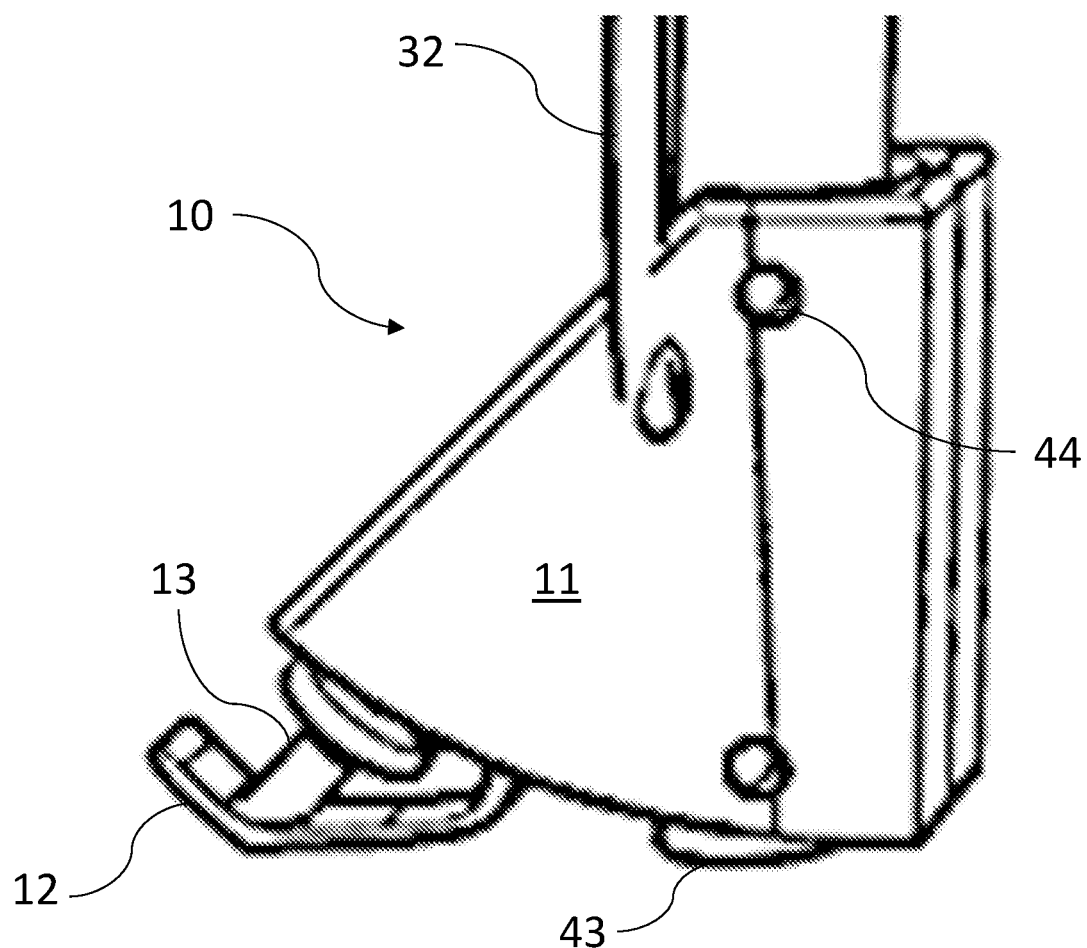
FIG. 2 illustrates a perspective view of the ski unit according to an embodiment of the present invention.

FIG. 2 illustrates the exterior of the modified ski unit 10 attached to the second leg 43. The modified ski unit 10 comprises a housing 11, a hinged sled member 12, a suspension member 13, and at least one compression coil (not shown). The housing 11 of the modified ski unit 10 may include an enclosure configured to attach to a second leg 43 and enclose one or more of: the suspension member 13, the compression coil, and a portion of the hinged sled member 12.

A bottom surface of the hinged sled member 12 may be configured to allow low-friction movement across a given surface. The hinged sled member 12 may also comprise a moveable segment capable of pivoting about an axis parallel with the ground surface and towards the second leg 43. The hinged sled member 12 may be coupled to the suspension member 13, configured to moveably retain the hinged sled member 12 in a resting position.

A bottom of the housing 11 may include an opening to allow the hinged sled member 12 to pivot into the housing 11 and pivot within the housing 11, such that the housing 11 itself does not contact the ground during use nor under force in the event of improper transfer technique. The brake cable 30 may be attached to the suspension member 13 within the housing 11. In one embodiment, the modified ski unit 10 includes a brake engagement mechanism which swivels around a fulcrum. The brake cable 30 is attached to the brake engagement mechanism. The brake engagement mechanism is configured to pull the brake cable 30 downward when a force is applied to the hinged sled member 12.

In some embodiments, the housing 11 may include an opening disposed through a length of the housing 11 configured to secure the modified ski unit 10 to the second leg 43, thereby allowing attachment and detachment of the modified ski unit 10 to and from a standard walker. The opening through the housing 11 may be configured to accept the second leg 43 therein. The second leg 43 may come into contact with the ground. In some embodiments, at least one fastener hole 44 may be drilled through the housing 11 and the second leg 43 to allow a fastener to be disposed through the fastener hole 44 in order to secure the housing 11 to the second leg 43. In an alternate embodiment, the housing 11 may be permanently secured to the second leg 43 by welding, gluing, or the like.

The suspension member 13 of the invention is coupled to at least one compression coil. The compression coil may be configured to compress when a predetermined amount of force, or weight, is applied to the hinged sled member 12 and suspension member 13. Applying the predetermined amount of force to the walker, such as when the user-patient uses an improper transfer technique, will exert a force on the hinged sled member 12, causing the hinged sled member 12 to rotate and exert a force on the suspension member 13 and the compression coil. Force applied through the suspension member 13 and compression coil actuates the brake cable 30, engaging the bracket structure 21 of the braking mechanism 20 (further described in FIG. 3).

The predetermined amount of force may be selected and set by a user-patient or professional through adjustment of the suspension member 13, or by using one or more additional suspension members. The predetermined amount of force is configured so that, upon compression of the suspension member 13, the housing 11 of the modified ski unit 10 will not to come into contact with a ground surface.

In other embodiments, the predetermined amount of force may be preconfigured and set during manufacturing of the invention based on an acceptable industry standard. In an alternate embodiment where the predetermined amount of force is configured during manufacturing, the predetermined amount of force may still be adjustable by the user-patient or professional.

Figure 3:
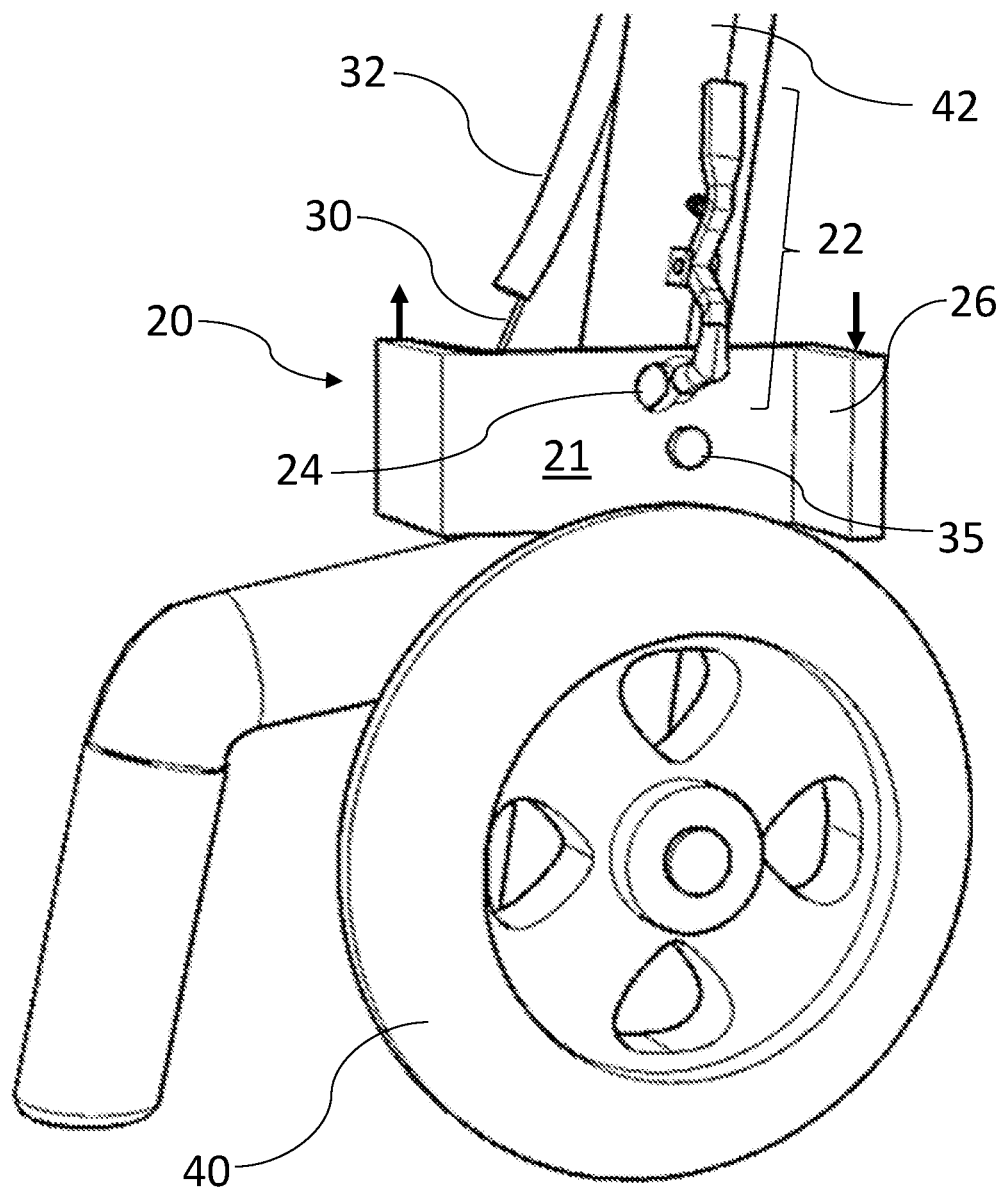
FIG. 3 illustrates a perspective view of the braking mechanism and wheel according to an embodiment of the present invention.

FIG. 3 illustrates the braking mechanism 20 mounted to the first leg 42 above the wheel 40. The braking mechanism 20 comprises a pivotable bracket structure 21, and a locking member 22. The pivotable bracket structure 21 includes a wheel engagement member 26. The brake cable and hose 30 comprise a first end and a second end, wherein the first end is coupled to the modified ski unit 10 and the second end is coupled to the braking mechanism 20.

The braking mechanism 20 may be attached to the first leg 42 with a pivot mount 35 that allows the pivotable bracket structure 21 to rotate about the pivot mount 35. The pivot mount 35 may also include a fastener such as bolt, screw, or the like. In an alternate embodiment, the pivotable bracket structure 21 may move up and down; in another embodiment the pivotable bracket structure 21 may swivel. In an alternate embodiment, the braking mechanism 20 may be mounted to the first leg 42 through the hole 24 which may be disposed through both the braking mechanism 20 and the first leg 42, secured by a fastener.

Force applied through the suspension member 13 and compression coil of the modified ski unit 10 actuates the brake cable 30, engaging the pivotable bracket structure 21 of the braking mechanism 20. The brake cable 30 is attached to the first end of the bracket structure 21, whereas the second end of the pivotable bracket structure 21 includes the wheel engagement member 26. The brake cable 30 may exert a torque on the pivotable bracket structure 21, causing the pivotable bracket structure 21 to rotate about the pivot mount 35. As a result, the wheel engagement member 26 rotates downward to engage the wheel 40. As shown in FIG. 3, the pivotable bracket structure 21 rotates clockwise about the pivot mount 35. In an alternate embodiment, the bracket structure 21 may rotate counter-clockwise.

Figure 4:
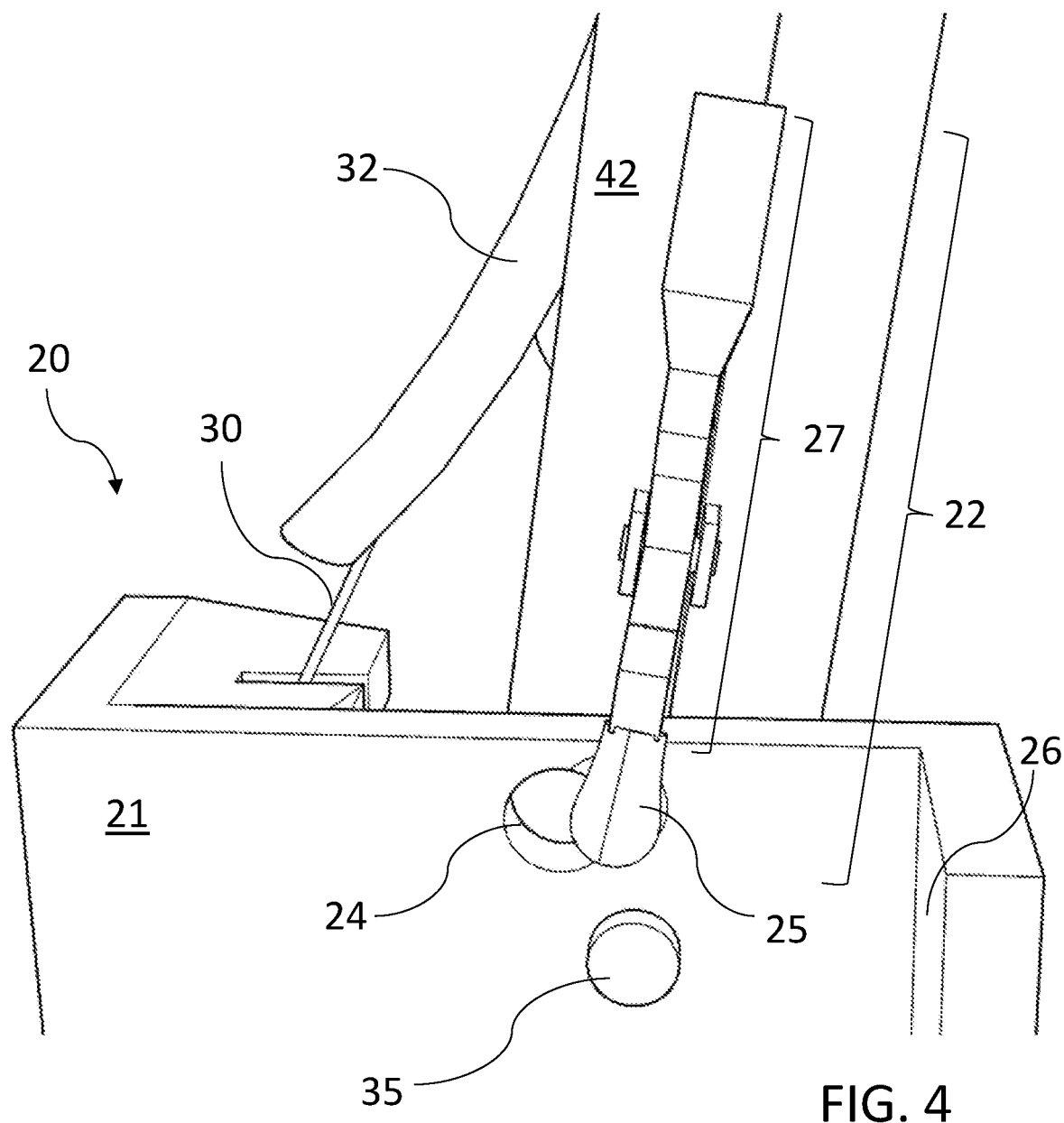
FIG. 4 illustrates a perspective view of the braking mechanism according to an embodiment of the present invention.
Figure 5:
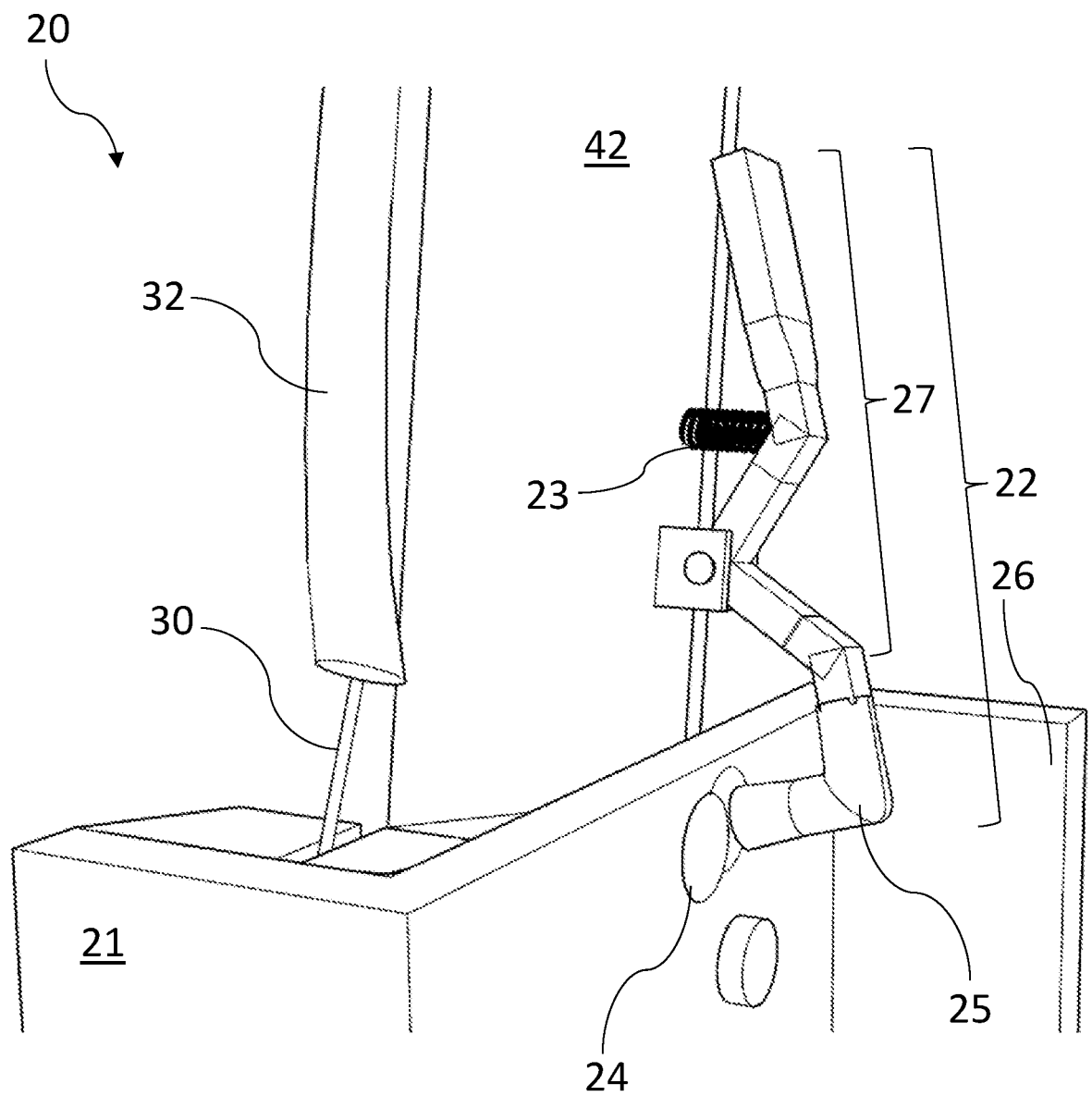
FIG. 5 illustrates a perspective view of the braking mechanism according to an embodiment of the present invention.

FIG. 4 illustrates a side view of the braking mechanism 20 secured to the first leg 42. FIG. 5 illustrates a front view of the braking mechanism 20 secured to the first leg 42. The braking mechanism 20 further comprises a locking member 22 and a pivotable bracket structure 21. The pivotable bracket structure 21 may include a cable attachment point, a pivot mount 35, a wheel engagement member 26, and at least one hole 24 disposed through the pivotable bracket structure 21. The locking member 22 may further include a tension member 23, a pleated lever 27, and a striking member 25.

The pleated lever 27 comprises a first end, a second end, and a center. The first end of the locking member 22 further comprises a tension member 23 configured to maintain a set position of the locking member 22. The second end of the locking member 22 comprises a striking member 25 configured to enter and pass through the hole 24 disposed through the pivotable bracket structure 21. The striking member 25 may be physically connected to one end of the pleated lever 27. In some embodiments of the invention, the locking member 22 may be coupled to the first leg 42 such that a center point of the pleated lever 27 of the locking member 22 acts as a fulcrum for the pleated lever 27.

The tension member 23 comprises a first end and a second end. The first end of the tension member 23 is coupled to the first end of the locking member 22 and the second end of the tension member 23 is coupled to the first leg 42. The tension member 23 further exerts a force on both the locking member 22 and the first leg 42. Exertion of force on the locking member 22 causes the second end of the locking member 22 to transfer the force through the locking member 22 and against the pivotable bracket structure 21 of the braking mechanism 20. When the brake mechanism 20 is engaged and the hole 24 aligns with the striking member 25, the force exerted on the locking member 22 results in moving the striking member 25 through the hole 24 to make contact with the first leg 42.

The striking member 25 is configured to pass through the hole 24 and strike the first leg 42 with sufficient force to produce an audible sound upon contact. The sufficient force of the striking member 25 is determined by the tension member 23 and may be configured through adjustment of the tension member 23. The striking member 25, and the second end of the locking member 22, are further configured to secure the pivotable bracket structure 21 and prevent the wheel engagement member 26 from disengaging the wheel 40. Engagement of the wheel 40 by the wheel engagement member 26 prevents movement of the walker in any direction until the braking mechanism 20 is manually disengaged.

The braking mechanism 20 may be reset for use by a user-patient by exerting a force on the first end of the locking member 22 to retract the striking member 25 from the hole 24, thereby allowing the wheel engagement member 26 to disengage the wheel 40 and decompressing the suspension member 13 of the modified ski unit 10 to its original position.

The method of using the invention, specifically where a user-patient implements improper technique to execute a transfer, results in the invention preventing further movement of the walker and user-patient, as well as providing an audible indication that improper technique was utilized. The invention, when used with proper technique, is configured to function as a standard walker in support of the user-patient.

Use of improper transfer technique by a user-patient, such as applying weight sufficient to tip the walker back towards the user-patient, will exert a force on the hinged sled member 12 of the modified ski unit 10 to rotate and exert a force on the suspension member 13 and the compression coil. Force applied through the suspension member 13 and compression coil actuates the brake cable 30, engaging the bracket structure 21 of the braking mechanism 20. The bracket structure 21 then pivots to engage the wheel 40 and prevent it from rotating, also releasing the locking member 22 and the striking member 25. The brake mechanism 20 automatically engages upon the use of an improper transfer technique, so the user-patient does not need to be manually engaged.

The striking member 25 then strikes the first leg 42 to emit an audible sound, indicating to the user-patient that an improper transfer technique was utilized. The walker will thereafter be immobile due to the engagement of the braking mechanism 20. The audible alert upon improper transfer technique aids in training and reinforcing proper transfer techniques to reduce likelihood of injury.

Those of ordinary skill in the art will understand and appreciate that the foregoing description of the invention has been made with reference to certain exemplary embodiments of the invention, which describe a safety training device capable of being attached to an existing front-wheeled walker. Those of skill in the art will understand that obvious variations in system configuration, protocols, parameters or properties may be made without departing from the scope of the invention which is intended to be limited only by the claims appended hereto.

What is claimed is:

1. A walker safety training device comprising:
    a. a modified ski unit, wherein the modified ski unit comprises a housing, a hinged sled member, a suspension member, and at least one compression coil, wherein the hinged sled member is coupled to the suspension member, wherein the suspension member is coupled to the at least one compression coil;
    b. a braking mechanism, wherein the braking mechanism comprises a pivotable bracket structure, a wheel engagement member, a locking member and a striking member; and
    c. a brake cable having a first end and a second end, wherein the first end of the brake cable is coupled to the modified ski unit, wherein the second end of the brake cable is coupled to the braking mechanism.

2. The modified ski unit of claim 1, wherein the housing comprises an enclosure configured to attach to a leg of a walker, wherein the enclosure encloses the suspension member, the at least one compression coil, and a portion of the hinged sled member.

3. The modified ski unit of claim 2, wherein the hinged sled member comprises a moveable segment, wherein the moveable segment pivots about an axis parallel with a given ground surface and towards the leg of the walker.

4. The modified ski unit of claim 3, wherein the housing further comprises an opening configured to allow the hinged sled member to pivot into and within the housing.

5. The modified ski unit of claim 4, wherein an opening is disposed through a bottom of the housing.

6. The modified ski unit of claim 4, wherein the suspension member is configured to moveably retain the hinged sled member in a resting position.

7. The walker safety training device of claim 1, wherein the brake cable is enclosed by a hose.

8. The braking mechanism of claim 1, wherein the pivotable bracket structure further comprises a cable attachment point, a pivot mount, a wheel engagement member, and at least one hole disposed through the pivotable bracket structure.

9. The braking mechanism of claim 8, wherein the wheel engagement member is configured to engage a wheel of the walker, thereby preventing the wheel from rotating.

10. The braking mechanism of claim 9, wherein the locking member further comprises a pleated lever having a first end, a second end, and a center, wherein the first end includes a tension member configured to maintain a set position of the locking member, wherein the second end is coupled to the striking member.

11. The braking mechanism of claim 10, wherein the locking member is configured to couple and retain the wheel engagement member in a position wherein the wheel of the walker is engaged and prevented from rotating.

12. The braking mechanism of claim 11, wherein the striking member is configured to enter and pass through the at least one hole disposed through the pivotable bracket structure, wherein the striking member strikes a leg of the walker.

\* \* \* \* \*